US006773048B1

(12) United States Patent
Freeman (10) Patent No.: US 6,773,048 B1
(45) Date of Patent: Aug. 10, 2004

(54) REINFORCED FASTENER ASSEMBLY FOR A VEHICLE SHEET METAL BODY STRUCTURE

(75) Inventor: Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 10/250,221

(22) Filed: Jun. 13, 2003

(51) Int. Cl.[7] .............................. B60R 21/10; B60N 2/02
(52) U.S. Cl. ................ 296/63; 296/65.16; 297/378.13; 280/801.2; 280/807; 280/808
(58) Field of Search ............................ 296/65.16, 68.1, 296/63, 65.01, 29, 30; 297/378.13; 248/503.1; 280/801.2, 807, 808

(56) References Cited

U.S. PATENT DOCUMENTS

| 4,475,763 A | * | 10/1984 | Hamatani et al. ......... 296/65.09 |
| 4,639,040 A | * | 1/1987 | Fujita et al. ............ 297/378.13 |

FOREIGN PATENT DOCUMENTS

| JP | 9-202194 | * | 8/1997 |
| JP | 10-218030 | * | 8/1998 |

* cited by examiner

Primary Examiner—Joseph D. Pape
(74) Attorney, Agent, or Firm—Gigette M. Bejin; Vincent C. Ilagan (57) ABSTRACT

A reinforced fastener assembly (18) for securing a vehicle seat (14, 16) to a vehicle sheet metal body structure (20) is provided. The reinforced fastener assembly (18) includes a mounting bracket (34) having a collar portion (36) for coupling to the vehicle sheet metal body structure (20) and distributing a load across a substantial portion of the vehicle sheet metal body structure (20). This mounting bracket (34) further includes an attachment portion (50) that has a vehicle seat fastener (52) extending therefrom. Finally, the reinforced fastener assembly (18) includes a tubular reinforcement member (78) that is coupled to and extends substantially across the collar portion (36) of the mounting bracket (34). This tubular reinforcement member (78) is intended to reinforce the collar portion (36) thereby allowing the collar portion (36) to distribute a load across a substantial portion of the vehicle sheet metal body structure (20).

20 Claims, 9 Drawing Sheets

REINFORCED FASTENER ASSEMBLY FOR A VEHICLE SHEET METAL BODY STRUCTURE

BACKGROUND OF INVENTION

The present invention relates generally to vehicle sheet metal body structures, and more particularly to a reinforced fastener assembly for securing a vehicle seat to a vehicle sheet metal body structure and securing the vehicle seat in a predetermined position during a crash.

Automotive manufacturers commonly produce vehicles having vehicle seats that can recline, fold, or otherwise move within the vehicle as desired. For example, certain sport utility vehicles include rear-seat split benches that can fold forward to increase the cargo capacity of the vehicle's rear cargo bay. These benches can also be locked in an upright position for allowing one or more persons to sit on the bench and safely travel in the vehicle.

The vehicle seats typically are locked in the upright position by utilizing one or more latches that are integrated within the vehicle seat. These latches are intended to engage opposing seat strikers that are mounted on a vehicle sheet metal body structure, e.g. a floor pan or a rear inner quarter panel. As is known in the art, a typical rear inner quarter panel is comprised of stamped sheet metal having a thickness of about 0.65 mm.

A disadvantage of existing seat strikers is that their construction can concentrate an applied load within a discrete section of the relatively thin rear inner quarter panel during a crash. As a result, the rear inner quarter panel can locally deform, tear, or otherwise yield. This panel failure may allow both the vehicle seat and a passenger who is belted on the vehicle seat to have unwanted movement. The amount of panel failure can be determined by a variety of conditions. Examples of these conditions include the weight of the passenger, the magnitude of the G-force exerted on the passenger, and the length of the moment arm measured from the seat striker to the seatbelt anchors that secure the passenger to the vehicle seat.

By way of illustration, panel failure can occur when a rear-seat split bench is subjected to a particular set of particular conditions as follows. As is known in the art, a conventional rear-seat split bench can be divided into a 40% bench portion and a 60% bench portion. It will be appreciated that locating the passenger in the center seat position of the 60% bench portion can create a relatively lengthy moment arm on the bodyside-mounted seat striker. During a front-end crash, this passenger may be subjected to a 30–35 G-force. Furthermore, it is understood that this passenger may be a 95th percentile individual who weighs approximately 250 lbs. From these conditions, it can be seen that a substantially high moment may be imparted upon the bodyside-mounted seat striker and the section of the rear inner quarter panel upon which the seat striker is mounted. As a result, the rear inner quarter panel can tear or otherwise fail. This panel failure may allow both the vehicle seat and the passenger who is belted on the vehicle seat to move forward. In this regard, the existing construction of the seat striker and its attachment to the rear inner quarter panel can compromise the safety of the passengers within the vehicle. Such a result clearly is undesirable.

Furthermore, it is understood that the vehicle bodyside construction can have relatively little available space for containing a fastener assembly therein. For example, the rear inner quarter panel can have a contoured wheelhouse section that defines a bottom boundary of the available space within the vehicle bodyside structure. Moreover, the rear inner quarter panel can also include a fuel-guide protrusion that defines a rear boundary of the available space.

In addition to the structural limitations of the rear inner quarter panel, it is understood that the available space within the vehicle bodyside structure can be decreased by the placement of various other devices on the same general section of the rear inner quarter panel. Examples of these devices include a door striker, a rollover crash sensor, an outboard seatbelt retractor, and a fuel-can member. In addition, it will be appreciated that various other devices or structural limitations can prevent existing fastener assemblies from attaching to a rear inner quarter panel and securing the vehicle seat in a predetermined position.

Therefore, a need exists for a reinforced fastener assembly that can distribute a load across a vehicle sheet metal body structure to preserve the integrity of the vehicle sheet metal body structure and secure a vehicle seat in a predetermined position during a crash, and also to allow for various other devices to be mounted to the same section of the vehicle sheet metal body structure.

SUMMARY OF INVENTION

The present invention provides a reinforced fastener assembly for securing a vehicle seat to a vehicle sheet metal body structure, e.g. a rear inner quarter panel. The reinforced fastener assembly includes a mounting bracket having a collar portion for coupling to the vehicle sheet metal body structure and distributing a load across a substantial portion of the vehicle sheet metal body structure. This mounting bracket further includes an attachment portion for mounting a vehicle seat fastener thereon. In one embodiment, this vehicle seat fastener is a seat striker that is intended to engage a latch formed within the vehicle seat. Finally, the reinforced fastener assembly includes a tubular reinforcement member that is coupled to and extends substantially across the collar portion of the mounting bracket. This tubular reinforcement member is intended to reinforce the collar portion and allow it to distribute an applied load or moment across a substantial portion of the vehicle sheet metal body structure.

One advantage of the present invention is that a reinforced fastener assembly is provided for securing a vehicle seat in a predetermined position when subjected to a substantially high G-force during a crash.

Another advantage of the present invention is that a reinforced fastener assembly is provided that distributes an applied load or moment across a substantial portion of a vehicle sheet metal body structure thereby preserving the integrity of the vehicle sheet metal body structure.

Yet another advantage of the present invention is that a reinforced fastener assembly is provided that allows for a variety of other devices to be positioned within the same general area of the vehicle sheet metal body structure.

Still another advantage of the present invention is that a reinforced fastener assembly is provided that is relatively lightweight for minimizing material costs and optimizing vehicle performance.

Other advantages of the present invention will become apparent upon considering the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of the examples of the invention.

DETAILED DESCRIPTION

In the following figures, the same reference numerals are used to identify the same components in the various views.

The present invention is particularly suited for a reinforced fastener assembly that can secure a vehicle seat to a rear inner quarter panel and maintain it in a secured position when the vehicle seat is subjected to a substantial G-force during a crash. In this regard, the embodiments described herein employ features where the context permits. On the other hand, it is also understood that a variety of other embodiments without the described features are contemplated as well. For this reason, it follows that the present invention can be carried out in various other modes and utilized for other suitable applications as desired.

Figure 1:
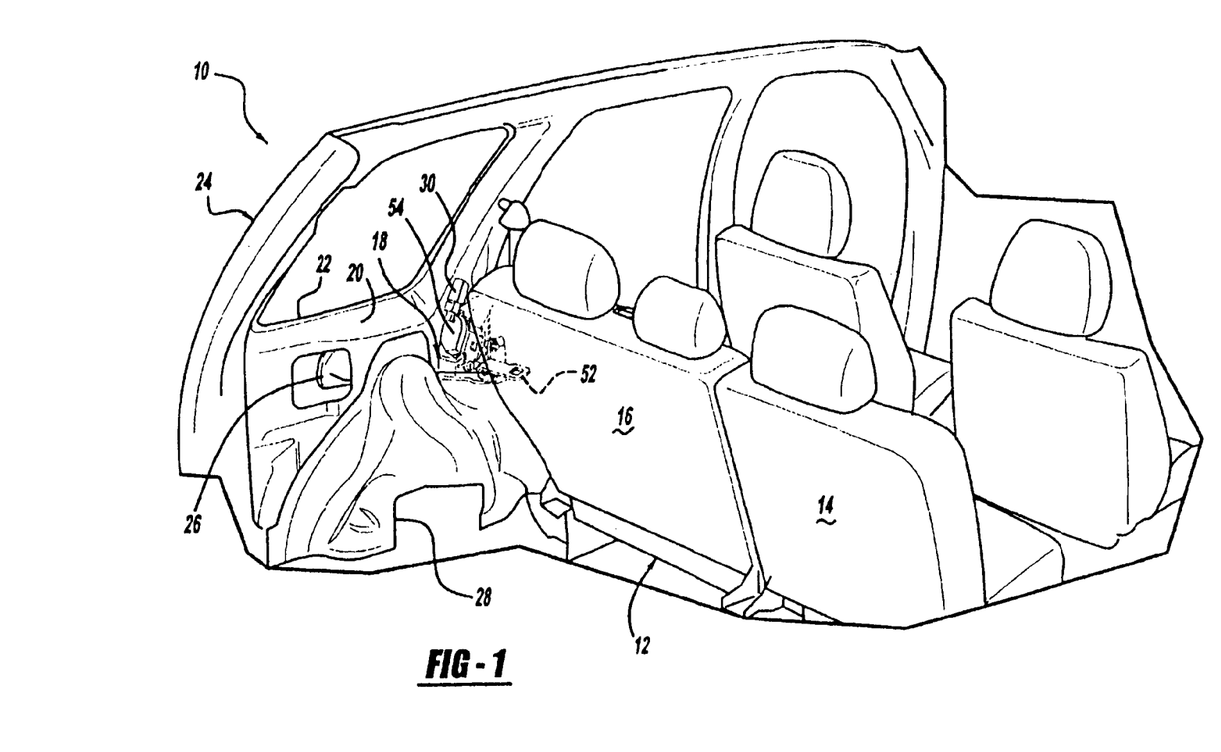
FIG. 1 is a partially cutaway perspective view of a vehicle interior with a reinforced fastener assembly integrated therein and a rear-seat split bench that has a 40% bench portion and a 60% bench portion, illustrating both portions in an upright position, according to one embodiment of the present invention.
Figure 2:
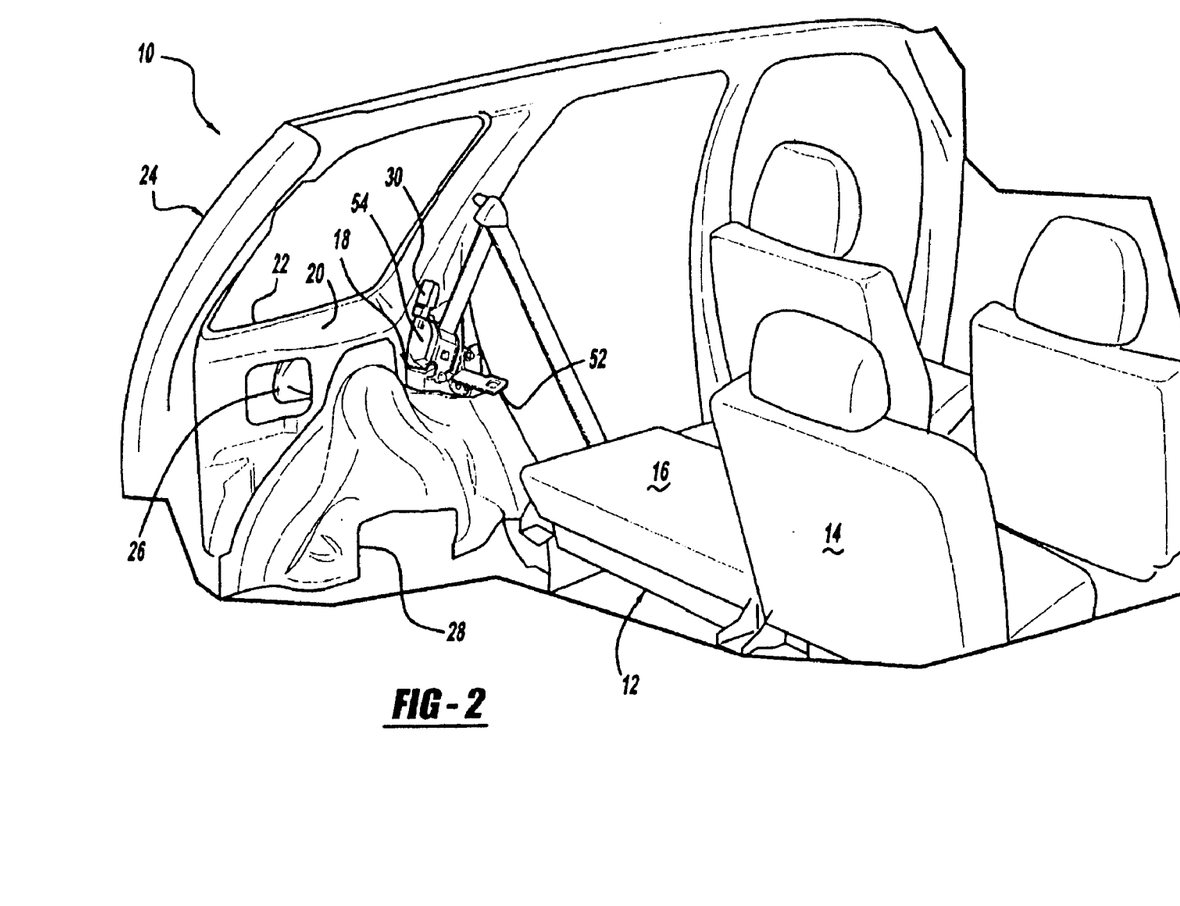
FIG. 2 is a partially cutaway perspective view of the vehicle shown in FIG. 1, illustrating the 60% bench portion of the rear-seat split bench in a folded position.

Referring to FIG. 1, there generally is shown a partially cutaway perspective view of a vehicle interior 10 including a conventional rear-seat split bench 12, according to one embodiment of the present invention. This rear-seat split bench 12 is comprised generally of a 40% bench portion 14 and a 60% bench portion 16. Obviously, the respective sizes of the bench portions 12, 14 can vary. As is known in the art, each bench portion 14, 16 is selectively and independently moveable between an upright position and a folded position. For example, as illustrated in FIG. 1, both bench portions 14, 16 are located in the upright position. Furthermore, as shown in FIG. 2, the 60% bench portion 16 can be moved to the folded position while the 40% bench portion 14 remains in the upright position. It is appreciated that the bench portions 14, 16 can be positioned in other configurations as desired. In addition, it is also understood that various other suitable vehicle seats may be utilized in place of the rear-seat split bench.

Each bench portion 14, 16 of the rear-seat split bench 12 includes a latch mechanism (not shown) for attachment to a vehicle bodyside structure. Specifically, as exemplified in FIG. 3, the 60% bench portion 16 can utilize the latch mechanism to engage a reinforced fastener assembly 18 that is mounted on the rear inner quarter panel 20. As a result, the 60% bench portion 16 is locked in the upright position and the reinforced fastener assembly 18 can prevent both the 60% bench portion 16 and a passenger who is belted on the 60% bench portion 16 from moving forward during a crash.

The reinforced fastener assembly 18 has a sufficiently strong construction that distributes an applied load across a substantial portion of the rear inner quarter panel 20. The widespread distribution of the applied load allows the rear inner quarter panel 20 to receive the applied load without locally deforming, tearing, or otherwise yielding. For this reason, the reinforced fastener assembly 18 can secure both the bench portion 14, 16 and the passenger who is belted on that bench portion 14, 16 in a predetermined position during a crash. The construction of the reinforced fastener assembly is detailed in the description for FIGS. 6–9.

Figure 3:
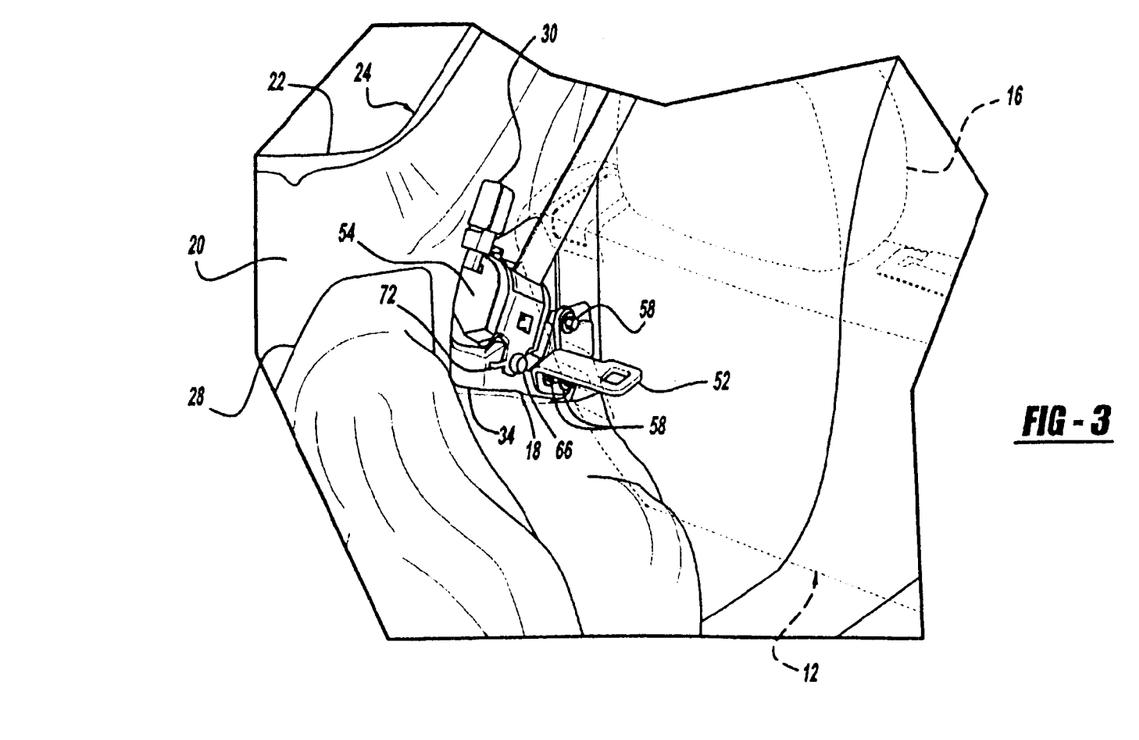
FIG. 3 is an enlarged interior view of a reinforced fastener assembly integrated within a vehicle bodyside structure, according to one embodiment of the present invention.
Figure 4:
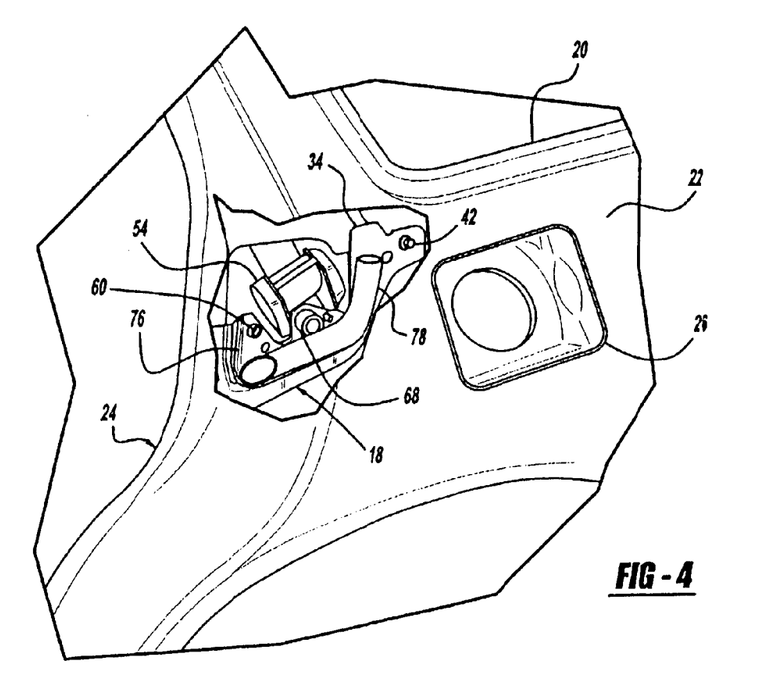
FIG. 4 is an enlarged exterior view of the reinforced fastener assembly and the vehicle bodyside structure shown in FIG. 3.
Figure 5:
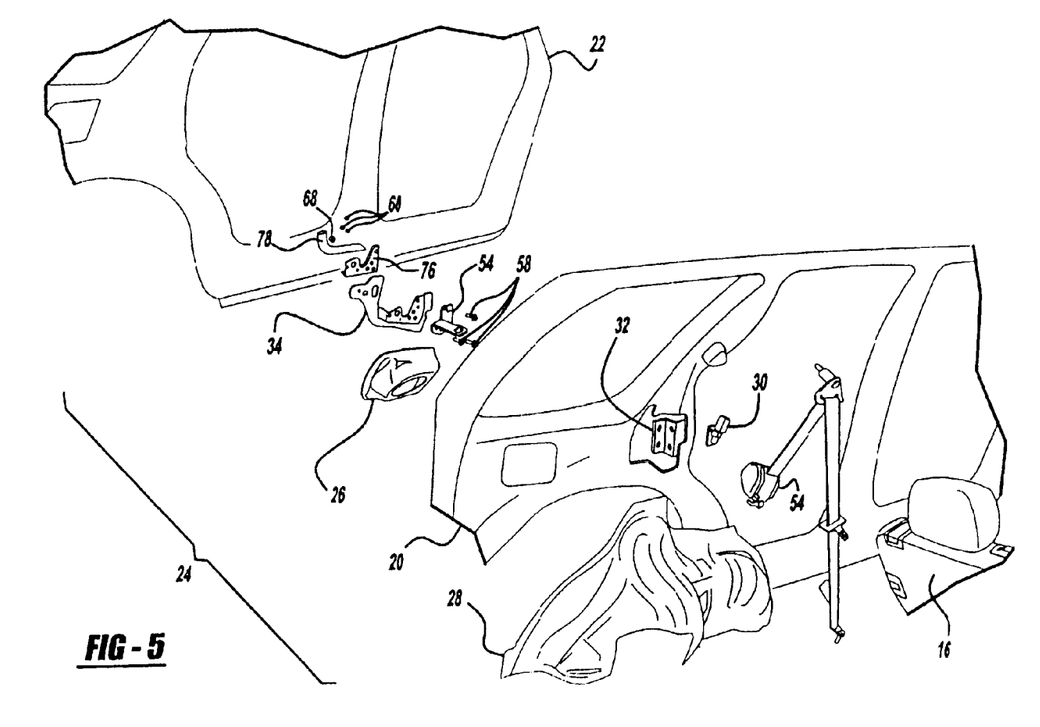
FIG. 5 is an exploded view of the portion of the vehicle interior shown in FIG. 1.

Referring now to FIGS. 3–5, it can be seen that a vehicle bodyside structure 24 can have a relatively little amount of available space therein for containing the reinforced fastener assembly 18 adjacent to the rear-seat split bench 12. As is known in the art, a rear portion of the vehicle bodyside structure 24 is comprised of the rear inner quarter panel 20 and a bodyside panel 22 which is spot-welded, bolted, or otherwise coupled to the rear inner quarter panel 20.

Specifically, the rear inner quarter panel 20 has a construction which creates the relatively little amount of available space within the vehicle bodyside structure 24. With particular attention to FIG. 6, it can be seen that this rear inner quarter panel 20 has a contoured wheelhouse section 25 and a fuel-guide protrusion 27 extending from the contoured wheelhouse section 25. The contoured wheelhouse section 25 is intended to complement a wheelhouse panel 28 (shown in FIG. 5) that is coupled to the rear inner quarter panel 20 and the bodyside panel 22. Together the contoured wheelhouse section 27 and the wheelhouse panel 28 define a wheel well of the vehicle. Further, the fuel-guide protrusion 27 is coupled to a fuel-can member 26 and is utilized for receiving a fuel nozzle from a gas pump. In view of this construction, it will be appreciated that the contoured wheelhouse section 25 and the fuel-guide protrusion 27 respectively define bottom and rear boundaries of the available space within the vehicle bodyside structure 24.

It is also understood that the relatively little available space can be further decreased by the integration of well known devices into the vehicle bodyside structure 24. These devices can be coupled to either the bodyside panel 22 or the rear inner quarter panel 20 and protrude into the relatively little available space therein. Examples of these devices include the fuel-can member 26, a rollover crash sensor 30, and a door striker 32 (shown in FIG. 5).

In view of these conditions, the reinforced fastener assembly 18 has a sufficiently small construction for utilizing the relatively little available space within the vehicle bodyside structure 24 while still distributing an applied load to a substantial portion of the rear inner quarter panel 20. Furthermore, it is understood that these particular devices 26, 28, 30, 32 merely exemplify one type of packaging restraint that can exist in connection with the rear inner quarter panel 20. In this respect, a variety of other devices or structural limitations may define or limit the construction of the reinforced fastener assembly 18. Furthermore, it will be appreciated that the reinforced fastener assembly 18 can be mounted on various other suitable vehicle sheet metal body structures, instead of the rear inner quarter panel. For example, the reinforced fastener assembly can be mounted or otherwise integrated on a vehicle underbody structure, e.g. a floor pan.

Figure 6:
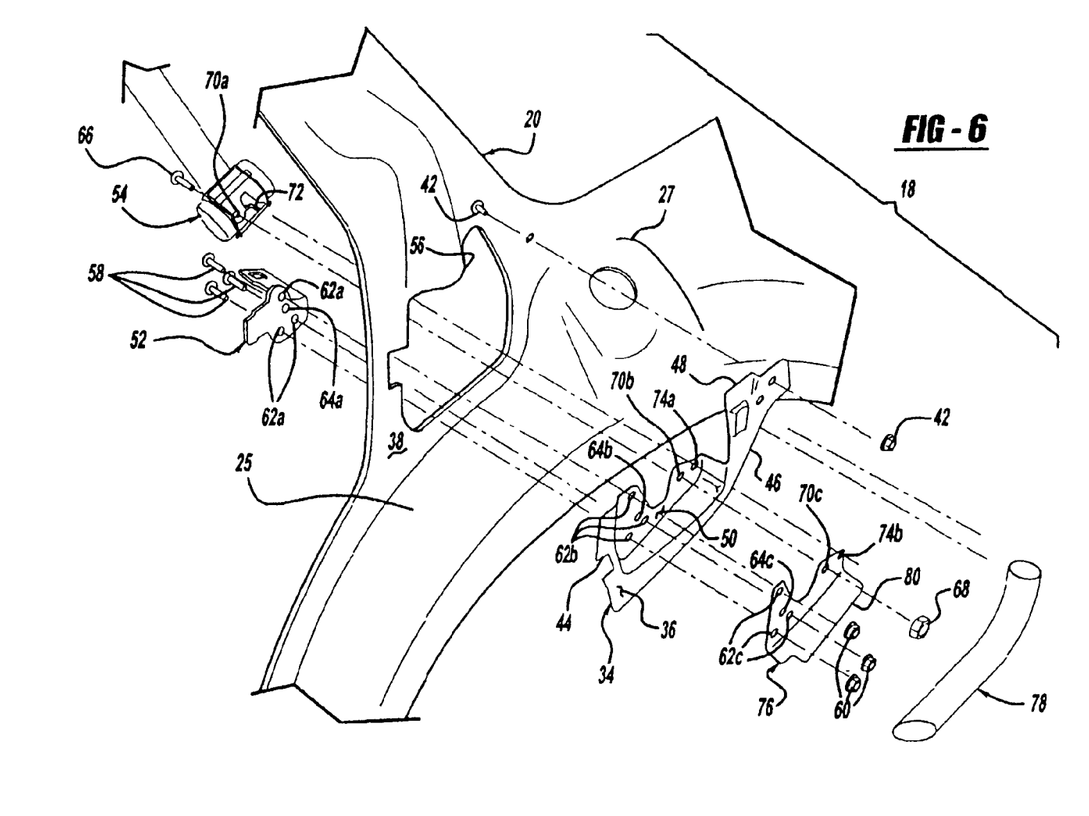
FIG. 6 is an exploded view of a reinforced fastener assembly, according to one embodiment of the invention.
Figure 7:
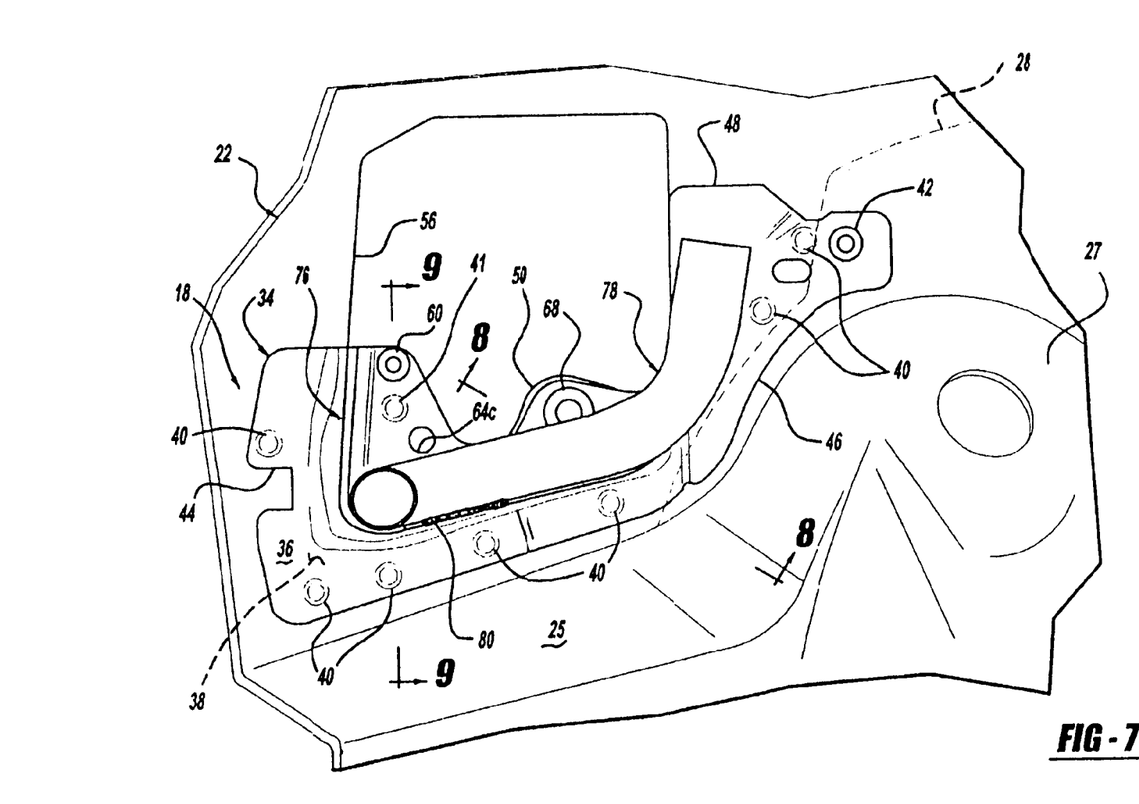
FIG. 7 is a partially cutaway side view of a reinforced fastener assembly taken from an exterior side of a rear inner quarter panel, according to one embodiment of the invention.

Referring now to FIGS. 6–9, the reinforced fastener assembly 18 includes a mounting bracket 34 that has collar portion 36 extending therefrom for attachment to a rear inner quarter panel 20. Specifically, as best illustrated in FIG. 7, this collar portion 36 is coupled to a panel mounting surface 38 on the exterior side of the rear inner quarter panel 20 via a series of spot-welds 40 and a nut and bolt fastening pair 42. However, it is understood that various other suitable fastening methods can be utilized as desired.

Both the collar portion 36 and the panel mounting surface 38 are sized sufficiently large for allowing the reinforced fastener assembly 18 to distribute an applied load to a substantial portion of the rear inner quarter panel 20. As explained hereinabove, this widespread distribution of the applied load decreases the risk of locally deforming tearing the rear inner quarter panel 20. In this regard, the distribution of the applied load preserves the integrity of the rear inner quarter panel and secures the vehicle seat in a predetermined position within the vehicle.

In addition, the collar portion 36 and the panel mounting surface 38 are also sized sufficiently small to allow various devices 26, 28, 30, 32 to mounted on or otherwise positioned adjacent to the same general portion of the rear inner quarter panel 20. Specifically, the collar portion 36 has a door striker notch 44 integrally formed therein for providing clearance for the door striker 32. Furthermore, the collar portion 36 includes a contoured wheelhouse edge 46 that provides clearance for the contoured wheelhouse section 25 of the rear inner quarter panel 20. The collar portion 36 also has a contoured crash sensor edge 48 that provides clearance for the rollover crash sensor 30.

It will be appreciated that FIGS. 6–9 merely illustrate an exemplary construction of the collar portion 36. In this regard, the collar portion may instead have various other constructions for distributing an applied load to a substantial portion of the rear inner quarter panel while simultaneously providing clearance for other devices mounted to or otherwise position adjacent to the same general portion of the rear inner quarter panel 20.

The mounting bracket 34 also includes an attachment portion 50 for mounting a vehicle seat fastener 52 and a seatbelt retractor 54 thereon. This attachment portion 50 is offset from the collar portion 36 for extending the attachment portion 50 through an opening 56 formed in the rear inner quarter panel 20 and positioning the vehicle seat fastener 52 closer to the 60% bench portion 16.

As best shown in FIG. 6, the vehicle seat fastener 52 is a seat striker that is intended to engage the latch mechanism of the 60% bench portion 16 and secure that bench portion 16 in the upright position. In one embodiment, the vehicle seat fastener 52 is attached to the mounting bracket 34 by three bolt fasteners 58 and three opposing weld-nut fasteners 60. In this way, the vehicle seat fastener 52 and the attachment portion 50 each have three striker holes 62a, 62b formed therein for receiving the respective bolt fasteners 58. In addition, both the vehicle seat fastener 52 and the attachment portion include a striker locator hole 64a, 64b for receiving a locating member (not shown) of a tool (not shown) and allowing that tool to position the vehicle seat fastener 52 on the attachment portion 50. In addition to this embodiment, it is contemplated that more or less than three bolt fasteners, three nut fasteners, and three striker holes may be utilized desired. Furthermore, it is also appreciated that other fastening methods, e.g. spot-welding, can be utilized to attach the vehicle seat fastener 52 to the attachment portion 50 of the mounting bracket 34.

The seatbelt retractor mechanism 54 is also fixedly coupled to the attachment portion 50 of the mounting bracket 34 in a predetermined position. It is understood that conventional seatbelt retractor mechanisms are tuned to produce specific results based upon the position of the seatbelt retractor mechanism 54, e.g. the angle by which the seatbelt is unreeled from the seatbelt retractor mechanism 54. This seatbelt retractor mechanism 54 is secured to the attachment portion 50 by a retractor bolt fastener 66 and a retractor nut fastener 68. In this regard, the seatbelt retractor mechanism 54 and the attachment portion 50 of the mounting bracket 34 each have a retractor hole 70a, 70b formed therein for receiving the retractor bolt fastener 66. The seatbelt retractor mechanism 54 also has a locator finger 72 extending therefrom for insertion into a retractor locator hole 74a that is formed in the attachment portion 50 of the mounting bracket 34. Inserting this locator finger 72 into the retractor locator hole 74a allows a tool to position the seatbelt retractor mechanism 54 on the attachment portion 50 and to sufficiently tighten the engagement between the retractor bolt fastener 66 and the retractor nut fastener 68.

In one embodiment, the reinforced fastener assembly 18 further includes a nut base plate 76 for reinforcing the attachment portion 50 of the mounting bracket 34. The nut base plate 76 is similar in construction to that of the attachment portion 50 in that the nut base plate 76 has three striker holes 62c, a striker locator hole 64c, a retractor hole 70c, and a retractor locator hole 74b. All of these holes 62c, 64c, 70c, 74b are intended to align with corresponding holes formed in the attachment portion 50, the vehicle seat fastener 52, and the seatbelt retractor mechanism 54 for the purpose of receiving the bolt fasteners 58, 66. This nut base plate 76 has a desired thickness for preventing the local deformation or tearing of the attachment portion 50 which may otherwise allow the nut fasteners 60, 68 to be torn through the attachment portion 50 of the mounting bracket 34. The nut base plate 76 is spot-welded to the attachment portion 50 via a series of spot-welds 41. However, it is understood that other fastening methods can be utilized as desired. Furthermore, the nut base plate 76 has the nut fasteners 60, 68 welded thereon for facilitating the build of the reinforced fastener assembly 18. However, it is understood that the nut fasteners can instead be separate pieces from the nut base plate 76.

In another embodiment, the reinforced fastener assembly does not include a nut base plate. Instead, the mounting bracket has a sufficient thickness or strength for preventing the nut fasteners from being torn through the holes formed in the attachment portion of the mounting bracket. It is understood that the increased thickness of the collar portion may prevent the mounting bracket from being spot-welded onto the rear inner quarter panel. For that reason, the mounting bracket can instead be mounted to the rear inner quarter panel via nut and bolt fasteners or various other suitable fasteners as desired.

Finally, the reinforced fastener assembly 18 further includes a tubular reinforcement member 78 for stiffening the collar portion 36 of the mounting bracket 34. This tubular reinforcement member 78 is fusion-welded to the collar portion 36 of the mounting bracket 34 and a ledge portion 80 of the nut base plate 76. However, it is contemplated that various other fastening methods can be utilized to couple the tubular reinforcement member 78 to the collar portion 36 of the mounting bracket 34 and the ledge portion 80 of the nut base plate 76. It will also be appreciated that the tubular reinforcement member 78 can be coupled to various other suitable portions of the reinforced fastener assembly 18 as desired.

This tubular reinforcement member 78 is contoured for attachment to the mounting bracket 34 and the nut base plate 76 and spanning substantially across the mounting bracket 34. In this regard, the tubular reinforcement member 78 strengthens a substantial portion of the reinforced fastener assembly 18. Moreover, the tubular reinforcement member 78 is contoured for fitting within the vehicle bodyside structure 24. Specifically, the tubular reinforcement member is curved according to the contour of the contoured wheelhouse section 25 and the fuel-guide protrusion 27 of the rear inner quarter panel 20.

Figure 8:
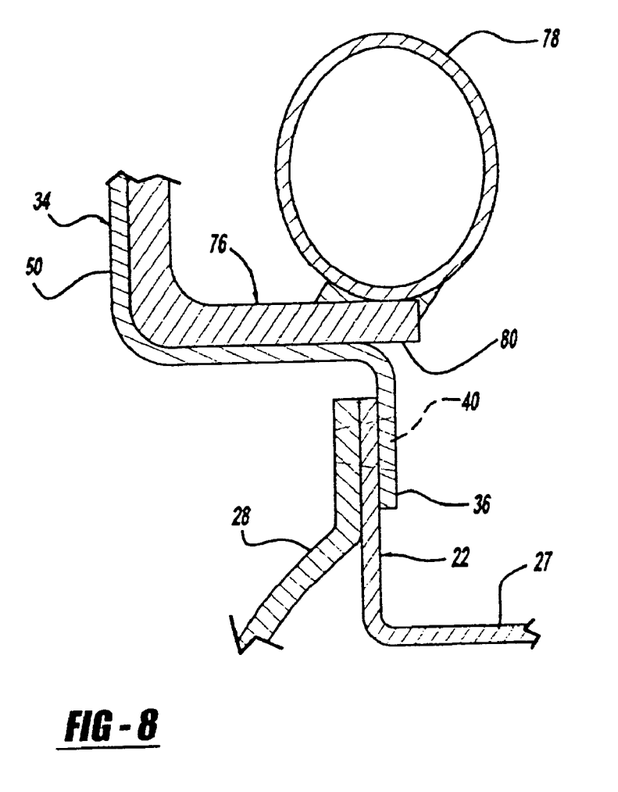
FIG. 8 is a cross-sectional view of the reinforced fastener assembly shown in FIG. 7, as taken along line 8—8.
Figure 9:
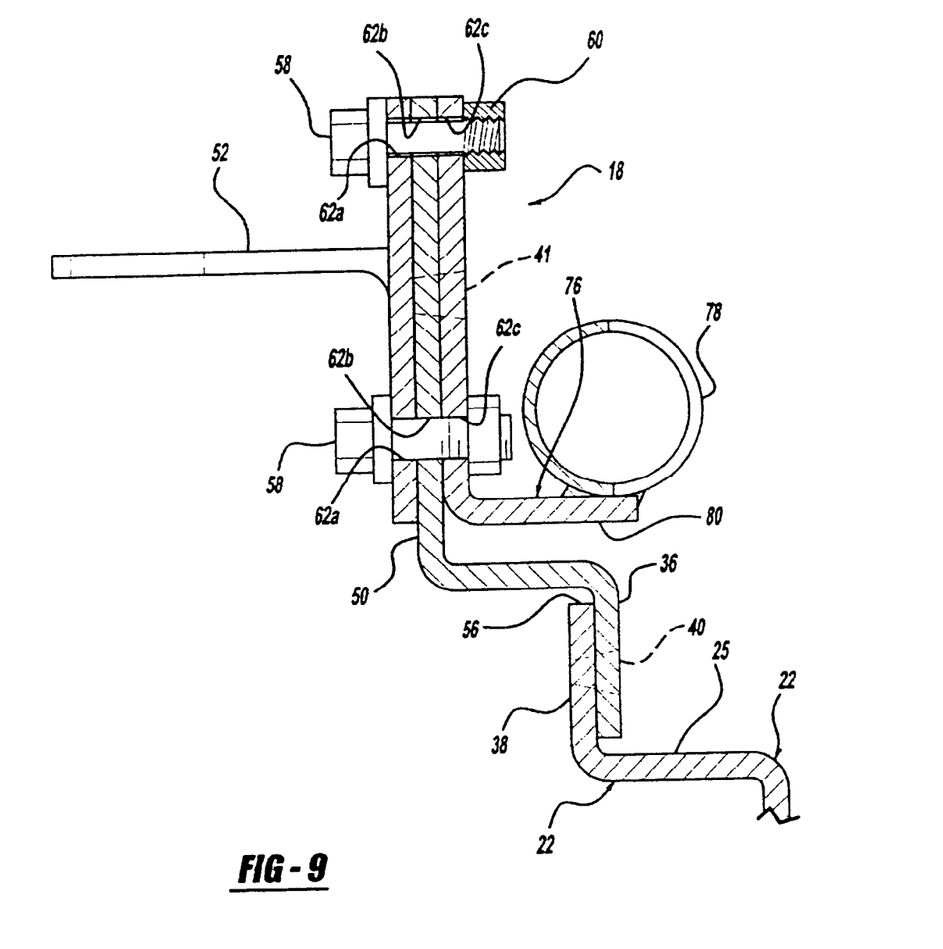
FIG. 9 is a cross-sectional view of the reinforced fastener assembly shown in FIG. 7, as taken along line 9—9.

With particular attention to FIGS. 7–9, it can be seen that the tubular reinforcement member 78 has a hollow tube construction. One of ordinary skill in the art will understand that this construction is beneficial because a hollow tube reinforcement can have an optimal strength-to-weight ratio for performance. In other words, the hollow tube structure provides the reinforced fastener assembly 18 with substantial strength yet also minimizes the amount of material comprising the tubular reinforcement member 78. This feature is beneficial because the tubular reinforcement member prevents the reinforced fastener assembly 18 from deforming or otherwise yielding and also decreases material costs and manufacturing costs.

The tubular reinforcement member 78 has a circular cross-section. However, it is contemplated that the tubular reinforcement member 78 can have a cross-section of various other suitable shapes, e.g. an ellipse or a polygon.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A reinforced fastener assembly for securing a vehicle seat to a vehicle sheet metal body structure, comprising:
    a mounting bracket having a collar portion for coupling to the vehicle sheet metal body structure and distributing a load across a substantial portion of the vehicle sheet metal body structure, said mounting bracket further including an attachment portion;
    a vehicle seat fastener extending from said attachment portion of said mounting bracket, said vehicle seat fastener for engaging an opposing vehicle seat fastener integrated within the vehicle seat; and
    a tubular reinforcement member coupled to and extending substantially across said mounting bracket and intended to reinforce said mounting bracket.

2. The reinforced fastener assembly recited in claim 1 wherein said tubular reinforcement member has a cross-sectional shape selected from the group consisting of a circle, a polygon, and an ellipse.

3. The reinforced fastener assembly recited in claim 1 wherein the vehicle sheet metal body structure is a rear inner quarter panel.

4. The reinforced fastener assembly recited in claim 3 wherein said collar portion has a door striker notch integrally formed therein for providing clearance for a door striker that is positioned adjacent to the reinforced fastener assembly.

5. The reinforced fastener assembly recited in claim 3 wherein said collar portion has a contoured wheelhouse edge for providing clearance for a contoured wheelhouse section of said rear inner quarter panel.

6. The reinforced fastener assembly recited in claim 3 wherein said collar portion has a contoured crash sensor edge that provides clearance for a vehicle crash sensor that is positioned adjacent to the reinforced fastener assembly.

7. The reinforced fastener assembly recited in claim 1 wherein said attachment portion is offset from said collar portion and intended to extend through an opening formed within the vehicle sheet metal body structure.

8. The reinforced fastener assembly recited in claim 1 wherein said collar portion is spot-welded to the vehicle sheet metal body structure.

9. The reinforced fastener assembly recited in claim 1 wherein the vehicle sheet metal body structure and said collar portion of said mounting bracket each have at least one aperture formed therethrough for receiving at least one bolt fastener and attaching said mounting bracket to the vehicle sheet metal body structure.

10. The reinforced fastener assembly recited in claim 9 wherein said mounting bracket has a bracket thickness that is at least two times greater than a panel thickness of the vehicle sheet metal body structure.

11. The reinforced fastener assembly recited in claim 1 wherein said tubular reinforcement member is fusion-welded to said mounting bracket.

12. A reinforced fastener assembly for securing a vehicle seat to a rear inner quarter panel, comprising:
    a mounting bracket having a collar portion for coupling to the rear inner quarter panel and distributing a load across a substantial portion of the rear inner quarter panel, said mounting bracket further including an attachment portion;
    a vehicle seat fastener coupled to said attachment portion of said mounting bracket, said vehicle seat fastener for engaging an opposing vehicle seat fastener integrated within the vehicle seat;
    a seatbelt retractor mechanism coupled to said attachment portion of said mounting bracket; and
    a tubular reinforcement member coupled to and extending substantially across said mounting bracket and intended to reinforce said mounting bracket.

13. The reinforced fastener assembly recited in claim 12 wherein said tubular reinforcement member has a cross-sectional shape selected from the group consisting of a circle, a polygon, and an ellipse.

14. The reinforced fastener assembly recited in claim 12 wherein said attachment portion of said mounting bracket and said seatbelt retractor mechanism each have a hole integrally formed therein for receiving a bolt fastener and attaching said seatbelt retractor mechanism to said mounting bracket.

15. The reinforced fastener assembly recited in claim 12 wherein said attachment portion of said mounting bracket has an opening formed therethrough for receiving a locator protrusion extending from said seatbelt retractor mechanism, said locator protrusion intended to position said seatbelt retractor mechanism in a predetermined orientation.

16. The reinforced fastener assembly recited in claim 12 wherein said collar portion has a door striker notch integrally formed therein for providing clearance for a door striker that is positioned adjacent to the reinforced fastener assembly.

17. The reinforced fastener assembly recited in claim 12 wherein said collar portion has a contoured wheelhouse edge for providing clearance for a contoured wheelhouse section of the rear inner quarter panel.

18. The reinforced fastener assembly recited in claim 12 wherein said collar portion has a contoured crash sensor edge that provides clearance for a vehicle crash sensor that is positioned adjacent to the reinforced fastener assembly.

19. A reinforced fastener assembly for securing a vehicle seat to a vehicle sheet metal body structure, comprising:

a mounting bracket having a collar portion for coupling to the vehicle sheet metal body structure and distributing a load across a substantial portion of the vehicle sheet metal body structure, said mounting bracket further including an attachment portion;

a vehicle seat fastener extending from said attachment portion of said mounting bracket, said vehicle seat fastener for engaging an opposing vehicle seat fastener integrated within the vehicle seat;

a nut base plate coupled to said attachment portion of said mounting bracket and intended to reinforce said attachment portion; and a tubular reinforcement member coupled to and extending substantially across said nut base plate and said collar portion of said mounting bracket, said tubular reinforcement member intended to reinforce said collar portion.

20. The reinforced fastener assembly recited in claim 19 wherein said nut base plate, said mounting bracket and said vehicle fastener each have at least one hole formed therethrough for receiving a bolt fastener, said nut base plate having at least one weld nut coupled adjacent to said at least one hole formed therethrough.

* * * * *